(12) United States Patent
Riddle et al.

(10) Patent No.: US 11,898,960 B2
(45) Date of Patent: *Feb. 13, 2024

(54) COLORIMETRIC DETECTION OF ACTINIDES

(71) Applicant: Energy, United States Department of, Washington, DC (US)

(72) Inventors: Catherine Riddle, Idaho Falls, ID (US); Rick L. Demmer, Idaho Falls, ID (US)

(73) Assignee: U.S. Department of Energy, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/465,200

(22) Filed: Sep. 2, 2021

(65) Prior Publication Data

US 2021/0396680 A1 Dec. 23, 2021

Related U.S. Application Data

(63) Continuation-in-part of application No. 16/895,188, filed on Jun. 8, 2020.

(Continued)

(51) Int. Cl.
  *G01N 21/78* (2006.01)
  *G01N 21/88* (2006.01)

(52) U.S. Cl.
  CPC ......... *G01N 21/78* (2013.01); *G01N 21/8803* (2013.01)

(58) Field of Classification Search
  CPC ..... G01N 21/78; G01N 21/8803; G01N 31/22
  See application file for complete search history.

(56) References Cited

U.S. PATENT DOCUMENTS

| 8,133,740 B1* | 3/2012 | DeVol | G01N 31/22 436/166 |
| 2008/0166792 A1* | 7/2008 | Attar | G01N 21/78 422/400 |

(Continued)

FOREIGN PATENT DOCUMENTS

WO  WO-2009116669 A1 * 9/2009  ............. G01N 21/78

OTHER PUBLICATIONS

Neil W. Hayes, Clare J. Tremlett, Patricia J. Melfi, Jonathan D. Sessler, Andrew M. Shaw, "Fibre optic system for detection of uranyl ions in the solution phase," Electro-Optical Remote Sensing, Detection, and Photonic Technologies and Their Applications (Nov. 7, 2007); doi: 10.1117/12.738060 (Year: 2007).*

(Continued)

*Primary Examiner* — Lyle Alexander
*Assistant Examiner* — Ali Husain Faraz
(74) *Attorney, Agent, or Firm* — Timothy L. Harney; Daniel Park; Brian J. Lally

(57) ABSTRACT

A method for rapid detection of actinides including the steps of having a support including a colorimetric complexation, placing the support in communication with a sample through urinalysis, and receiving a visual indicator from the colorimetric complexation. The sample having an unknown concentration of at least one actinide within it. The colorimetric complexation is configured to activate when contacted by a threshold concentration of an actinide.

20 Claims, 10 Drawing Sheets

(7 of 10 Drawing Sheet(s) Filed in Color)

Related U.S. Application Data

(60) Provisional application No. 62/864,722, filed on Jun. 21, 2019.

(56) References Cited

U.S. PATENT DOCUMENTS

| | | | | |
|---|---|---|---|---|
| 2012/0015444 A1* | 1/2012 | Mazumdar | ............... | C12Q 1/68 |
| | | | | 422/68.1 |
| 2013/0017617 A1* | 1/2013 | Roberson | ............... | G01N 21/78 |
| | | | | 436/164 |
| 2014/0287520 A1* | 9/2014 | Ghodousi | .............. | G01N 21/78 |
| | | | | 436/164 |
| 2015/0212059 A1* | 7/2015 | Schechter | .......... | G01N 33/1813 |
| | | | | 436/79 |
| 2018/0231517 A1* | 8/2018 | Blake | ................. | G01N 33/5308 |

OTHER PUBLICATIONS

Bohrer, Steven E, and David S Sill. "Determination of the Actinides in Fecal and Urine Samples with Total Sample Dissolution Using a Lithium Metaborate Fusion." Radiological and Environmental Science Laboratory, www.lanl.gov, https://www.lanl.gov/BAER-Conference/BAERCon-47p-Bohrer.pdf. (Year: 2001) (Year: 2001).*
Machine Translation of WO2009116669A1, pp. 1-24 (Year: 2009).*
Turner, Geraldine, The application of the passive sampling technique diffusive gradients in thin-films (DGT) to the measurement of uranium in natural waters, Graduate Thesis, 2013, University of Portsmouth, Portsmouth, Hampshire, UK.

* cited by examiner

COLORIMETRIC DETECTION OF ACTINIDES

CROSS-REFERENCE TO RELATED APPLICATIONS

This application claims priority benefit as a continuation-in-part of U.S. Non-Provisional patent application Ser. No. 16/895,188, filed Jun. 8, 2020, which in turn claims the benefit of U.S. Provisional Application No. 62/864,722, filed Jun. 21, 2019, the contents of each hereby incorporated by reference.

GOVERNMENT INTERESTS

The United States Government has rights in this invention pursuant to Contract No. DE-AC07-05ID14517 between the U.S. Department of Energy (DOE) and Battelle Energy Alliance.

FIELD OF THE INVENTION

The present invention relates to a method for colorimetric detection of actinides.

BACKGROUND OF THE INVENTION

Whether from a radiological dispersal device, improvised nuclear device, or even a reactor accident, it is widely recognized that a major nuclear incident is not about if it will happen, but when. Even in the best circumstances, most municipalities would face severe challenges in providing effective incident response to a large-scale radiation release caused by nuclear terrorism or a nuclear related accident. Hampering the effectiveness of first responders (local municipality's law enforcement and fire personnel) and the military to a radiological emergency is an insufficient amount of nuclide specific radiation detection equipment. Experience shows that first responders and the military will bear the major burden of coping with a nuclear terrorism incident response within the context of determining range of dispersal, cordoning an area to be secured for investigation, and pubic protection.

First responders, military personnel, and forensic investigators need simple, rapid, and reliable field equipment to detect radionuclide contamination. When responding to an event, handheld detectors may provide adequate screening for beta/gamma/neutron emitting radionuclides but lack the field sensitivity in dusty, outdoor environments and adaptability for alpha emitting radiological species like uranium (U) and plutonium (Pu). Whether a routine environmental drinking water sample or a first responder at a contamination scene, time is essential to answering the important questions regarding contamination: what is it and where is it? There is a growing need for a novel detection method that gives a simple and fast true or false result when determining whether actinide contamination has occurred during forensic investigations.

SUMMARY OF THE INVENTION

Embodiments of the invention relate to a method for colorimetric detection of actinides. The method has a support and sample. The support includes a colorimetric complexation. The sample has an unknown concentration of at least one actinide within it. The support is placed in communication with the sample through urinalysis and a visual indicator is received from the colorimetric complexation. The colorimetric complexation is configured to activate when contacted by a threshold concentration of an actinide

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Embodiments of the present invention are illustrated in the accompanying figures where.

Figure 12:
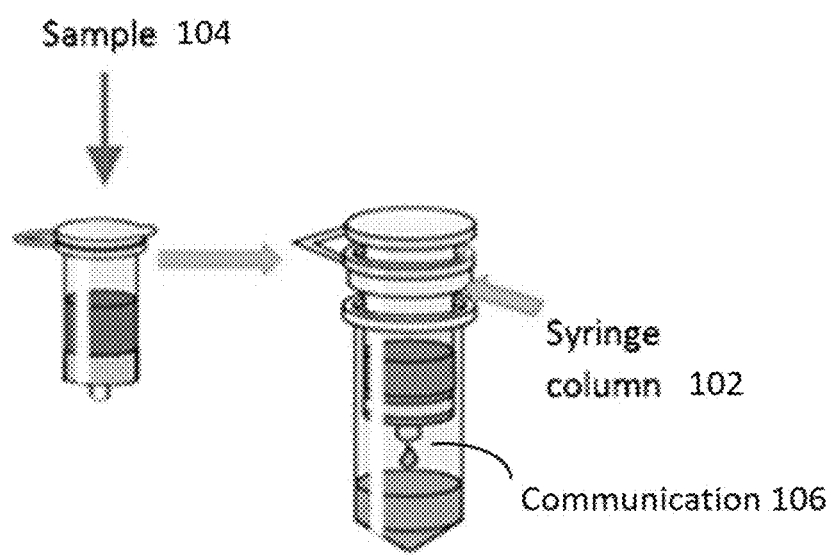
Figure 13:
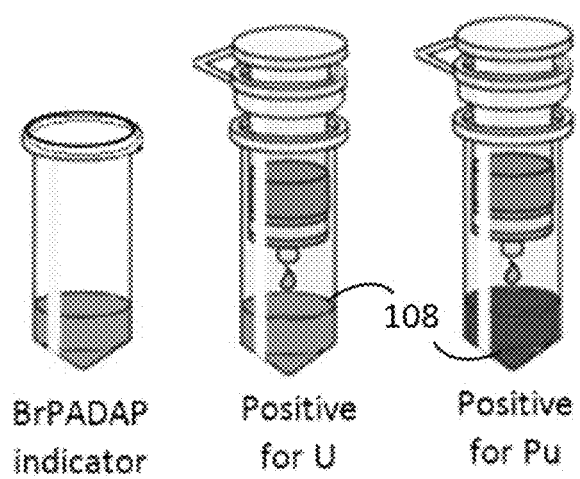
Figure 14:
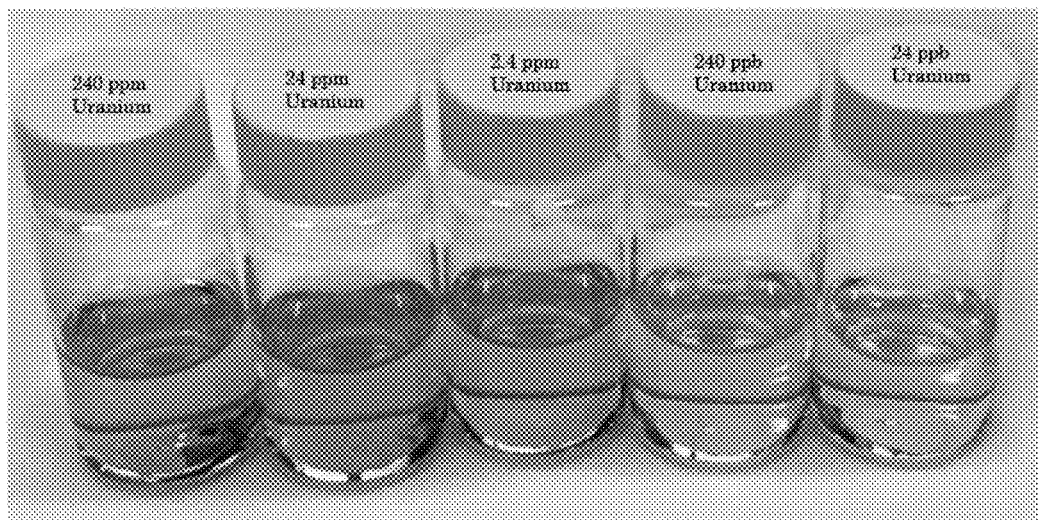
Figure 15:
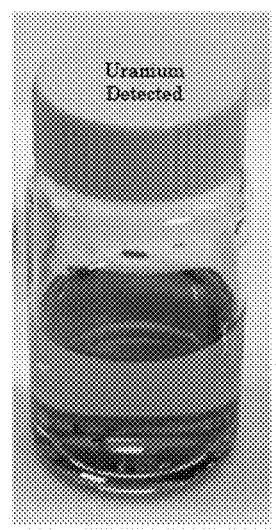
Figure 16:
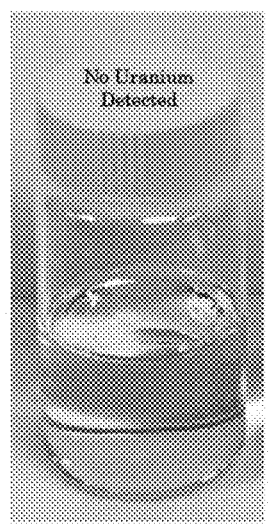
Figure 17:
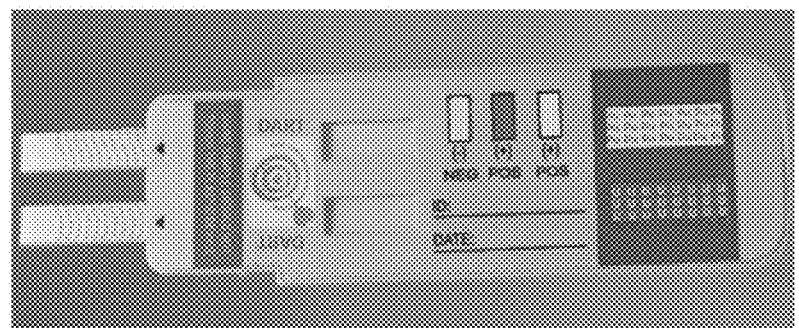

FIF. 11 depicts the ultraviolet visible spectra of uranium using a combination of Br-PADAP:PAN in a 2:1 ratio in drinking water;

FIG. 12 depicts an embodiment of a support and a sample used within the method for rapid detection of actinides;

FIG. 13 depicts an embodiment of a support used within the method for rapid detection of actinides;

FIG. 14 depicts colorimetric complexations activated with different amounts of Uranium;

FIG. 15 depicts a colorimetric complexation in drinking water activated by Uranium;

FIG. 16 depicts a colorimetric complexation in drinking water not activated; and FIG. 17 depicts an embodiment of a support used within the method for rapid detection of actinides.

DETAILED DESCRIPTION OF THE INVENTION

The following detailed description provides illustrations for embodiments of the present invention. Each example is provided by way of explanation of the present invention, not in limitation of the present invention. Those skilled in the art will recognize that other embodiments for carrying out or practicing the present invention are also possible. Therefore, it is intended that the present invention covers such modifications and variations as come within the scope of the appended claims and their equivalents.

Figure 1:
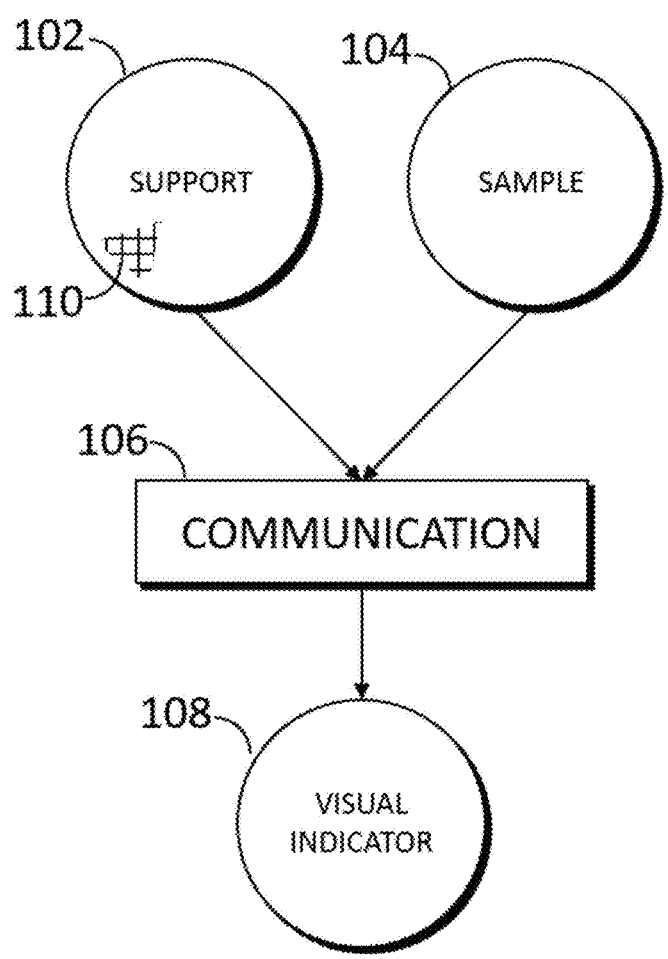
FIG. 1 is a flowchart illustrating a method according to an embodiment of the present invention.
Figure 2:
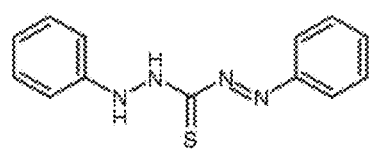
FIG. 2 is the structure of the colorimetric complexation dithizone.
Figure 3:
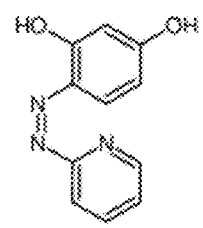
FIG. 3 is the structure of the colorimetric complexation pyridylazo.
Figure 4:
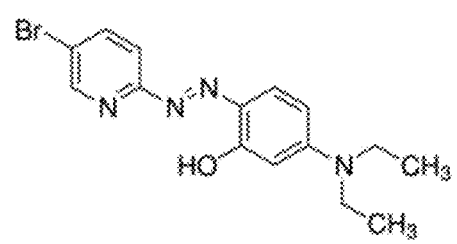
FIG. 4 is the structure of the colorimetric complexation Br-PADAP.
Figure 5:
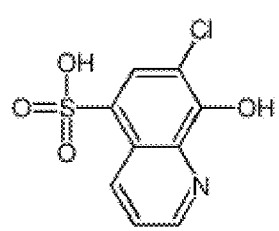
FIG. 5 is the structure of the colorimetric complexation 7-chloro-8-hydroxyquinoline-5-sulfonic acid.

Referring to FIG. 1, a method 100 for rapid detection of actinides is shown. First, a support 102 having a colorimetric complexation 110 that activates when contacted by a threshold concentration of an actinide is provided. The support 102 is placed in communication 106 with a sample 104 through urinalysis. The sample 104 has an unknown concentration of at least one actinide within it. If the sample's 104 concentration of at least one actinide is equal to or greater than the threshold indication level, a visual indicator 108 appears from the colorimetric complexation 110.

The sample 104 is urine for which actinide testing is needed. For example, the sample 104 can be urine from a first responder at a radiological event. The sample's 104 concentration of at least one actinide can be 0.0, e.g. there are no actinides present, or some number greater than 0.0, indicating there is a concentration of at least one actinide present.

The support 102 used in the method 100 can be any device or delivery vehicle capable of containing the colorimetric complexation 110 in a way that allows for the sample 104 to be tested. The support 102 can be, but is not limited to, a cotton swab, filter paper, a wipe, a detection pod, or a gel. For example, the support 102 could be a filter paper that is dipped into a urine sample 104 and the visual indicator 108 appears on the filter paper. In this example, the communication 106 of the support 102, which is the filter paper, and the sample 104 is that the support 102 is dipped into the sample 104.

Another example of the support 102, is that the support 102 could be a device upon which the sample 104 is placed. The sample 104 could be placed on the support 102 by placing the support 102 in the area the sample 104 stream is expected, the support 102 thereby catching the sample 104 midstream. The visual indicator 108 appears on the support 102. In this example, the communication 106 of the support 102 and the sample 104 is that the support 102 catches the sample 104 midstream.

As another example, the sample 104 is an aqueous solution. The sample 104 is injected into the support 102 that is also an aqueous solution. The injection of the sample 104 into the support 102 causes both the sample 104 and the support 102 to mix. In this example, the communication 106 of the support 102 and the sample 104 is that the two are mixed together.

The flexibility of the design for the support 102 allows for the method 100 for rapid detection of at least one actinide to be adaptable for the purpose of the detection. This flexibility also furthers the in-field uses of the present invention—there is no need for an off-site chemical analysis. The present invention allows for adaptability of the colorimetric technique for response personnel to determine if there is an actinide present. Actinides include any of the series of fifteen metallic elements from actinium (atomic number 89) to lawrencium (atomic number 103) in the periodic table. Actinides are radioactive, the heavier members being extremely unstable and not of natural occurrence. Actinium, thorium, protactinium, uranium, neptunium, plutonium, americium, curium, berkelium, californium, einsteinium, fermium, mendelevium, nobelium, and lawrencium are actinides. The benefits of using method 100 for the detection of actinides is that, when compared to the prior art, it is low cost, requires simple instrumentation outside of the support 102, is mobile, highly portable and is a rapid indicator of the presence of actinides—an invaluable time saver in situations where contamination, be it for routine purposes or for an accident, is being determined.

Figure 6:
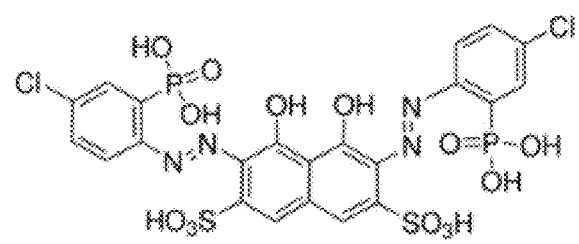
FIG. 6 is the structure of the colorimetric complexation chlorophosphonazo-III.
Figure 7:
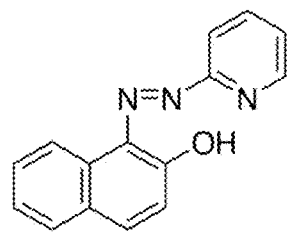
FIG. 7 is the structure of the colorimetric complexation 1-(2-pyridylazo)-2-naphthol (PAN)
Figure 8:
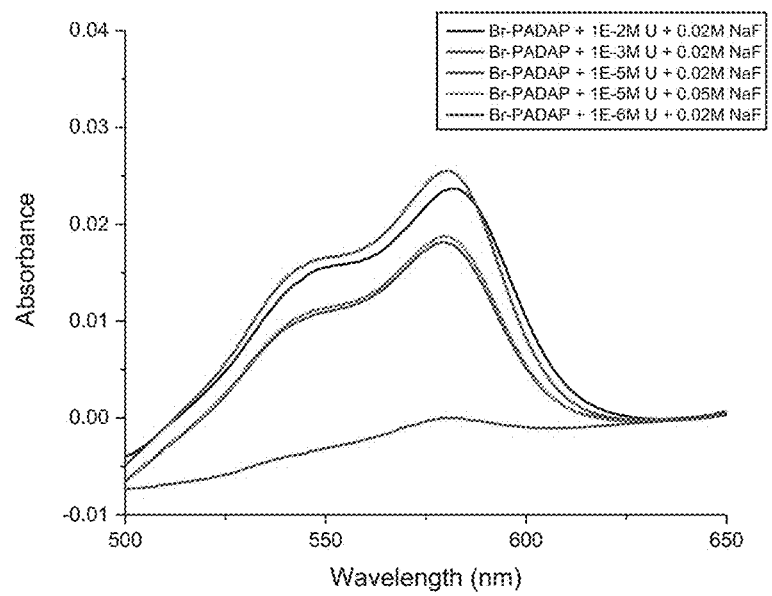
FIG. 8 depicts the ultraviolet visible spectra of uranium detection (578 nm) using a Br-PADAP colorimetric complexation.

The colorimetric complexation 110 contained by the support 102 can be any indicator responsive to actinides. The colorimetric complexation 110 can be a single indicator or any combination of indicators, those identified in the present application or any indicator, so long as the single indicator or the combination of indicators is responsive to actinides. The colorimetric complexation 110 activates by providing a visual response to a threshold concentration of at least one actinide. For example, the visual response can be changing from having no color visible with the naked eye, to having a specific color visible with the naked eye. For example, the visual response can be from having a particular color visible with the naked eye, to changing to a different color visible with the naked eye. For example, as shown in FIGS. 2-6, the colorimetric complexation 110 can be, but is not limited to, dithizone (FIG. 2), pyridylazo (FIG. 3), 2-(5-Bromo-2-pyridylazo)-5-(diethylamino)phenol (Br-PADAP) (FIG. 4), 7-chloro-8-hydroxyquinoline-5-sulfonic acid (FIG. 5), or chlorophosphonazo-III (FIG. 6). These five calorimetric complexations 110 are non-hazardous and environmentally friendly. Additionally, 7-chloro-8-hydroxyquinoline-5-sulfonic acid and 1-(2-pyridylazo)-2-naphthol (PAN) (FIG. 7) could be used in combination or in tandem with dithizone, pyridylazo, 2-(5-Bromo-2-pyridylazo)-5-(diethylamino)phenol (BrPADAP), 7-chloro-8-hydroxyquinoline-5-sulfonic acid, or chlorophosphonazo-III to increase the intensity of the visual indicator 108 and the selectivity of the actinide of interest. For example, the colorimetric complexation 110 can be used in tandem with 2-(5-bromo-2-pyridylazo)-5 (PAN), 5-diethylaminophenol (Br-PADAP) to increase the intensity of visual color change and selectivity of the actinide of interest. In an embodiment the colorimetric complexation is an isoamethurin mixture. In an embodiment, an aqueous support 102 is in communication 106 with an aqueous sample 104. The aqueous support 102 includes a $1\times10^{-5}$M Br-PADAP solution as the colorimetric complexation 110, and the colorimetric complexation 110 produces a visual indicator 108 for 23.8 ppb uranium. As seen in FIG. 8, the colorimetric complexation 110 may be detected via photometric methods in the range of 550 nm to 600 nm. The colorimetric complexation 110 is chosen based upon the actinide that is targeted for identification. The colorimetric complexation 110 is chosen to optimize the selectivity and sensitivity of the test based upon the testing environment. The colorimetric complexation 110 has a high degree of sensitivity, capable of detecting actinides present at parts-per-million levels and parts-per-billion levels. The colorimetric complexation 110 is capable of accurate detection of actinides even in the presence of environmental interfering ions (iron, nickel, calcium, potassium, etc.) or other potential environmental interferences, like dust and dirt.

The threshold indication level is the minimum concentration of an actinide within a sample 104 to produce a visual indicator 108 from the calorimetric complexation 110. The threshold indication level can vary depending upon the selectivity and sensitivity of the test and based upon the testing environment. Usually, the indication level is set to determine if there is even a trace amount of the actinide contained within the sample 104. For example, the threshold indication level can be when an actinide is present in a concentration on the order of parts-per-million, or more preferably parts-per-billion which translates into picocurie/liter (pCi/L) amounts of radioactivity. A higher degree of sensitivity is preferred, so long as accuracy and rapid response time are not sacrificed.

The method 100 for rapid detection of actinides can include an additional step to separate environmental interfering ions and potential environment interferences. The separation can take place through a filter, leach, rinse process to remove large particles or leach potential contamination from larger debris, a dissolution stage to solubilize smaller organic/inorganic material and use of a polymer gel for solid surfaces such as rock, metal, concrete, asphalt, which can be removed from the surfaces.

In an embodiment, the method 100 is repeated at least one more time. The repetition of the method 100 can be for detection of multiple actinides or different combinations of actinides. The repetition of the method 100 can also be for the identification of actinide contamination and effectively define the event area boundaries.

In an embodiment, the method 100 is incorporated into a comprehensive field detection system in response to a radiological incident for civilian or military purposes. In this embodiment, there could be multiple supports 102 that together can detect different groups of actinides from multiple sample 104 types from one radiological event. The visual indicator 108 could be one visual indicator 108 that presents uniquely for different actinides, or it could be multiple visual indicators 108 that appear for the actinides tested.

Colorimetric detection of actinides can be used as a rapid field analysis kit in response to radiological emergencies or routine testing in facilities containing nuclear materials. Colorimetric detection of actinides would be valuable for first responders and military personnel to determine the extent of radionuclide contamination using a rapid true or false analysis in the field with no off-site laboratory work required. Colorimetric detection of actinides will help first responders and military personnel determine the hazards of a nuclear event through onsite, real time analysis. The lack of specialized detection equipment for the determination of actinides may cause first responders to make decisions without complete information. Colorimetric detection of actinides facilitates an immediate and on-site analysis of actinides.

Colorimetric detection of actinides is different from prior art methods which use a "grab-sample" approach for actinides. The grab-samples are taken of the testing material in a single vessel, providing a snapshot view of the quality of the sample at the point it was taken at the time it was taken. The grab sample is then taken to a laboratory to conduct the testing because the prior art requires a laboratory and testing methods that cannot be done on-site. Without additional monitoring, that is, additional grab samples and testing taking place, the results cannot be extrapolated to other times or to other nearby locations.

The prior art methods are limited at best, because sampled material requires days to weeks of offsite radiochemical separation in a laboratory. Additionally, in the prior art methods, alpha contamination, as is emitted from actinides, is common from any present actinide species and is very difficult to detect with conventional methods due to masking by the natural environment.

This present invention will allow both domestic and international first responders to evaluate a contamination scene immediately giving them the ability to set up safety zones, pinpoint contamination, collect far fewer samples, and set up decontamination areas using real time data instead of assumptions in order protect the public as well as themselves. This work will also impact the safety and maintenance of nuclear facilities with the ability to identify potential leaks in key assemblies with a simple wipe or spray of an agent that turns color in the presence of actinides.

Referring to FIG. 8, 2-(5-Bronco-2-pyridylazo)-5-(diethylamino)phenol (Br-PADAP) mixed with sodium fluoride (NaF) showed affinity for activating in response to the presence of a uranium compound formation. Spectra for varied concentrations of uranium contacted with a Br-PADAP:NaF solution are shown in FIG. 8. The spectra show a stable U:Br-PADAP compound formation with the uranium signature at 578 nm. These samples had a visible color change as uranium formed a stable compound with Br-PADAP through the counter anion supplied by the sodium fluoride (NaF). All Br-PADAP concentrations for this experiment were 1E-5M. A concentration of 578 μm was found to be the optimal concentration for this calorimetric complexation 110.

Figure 9:
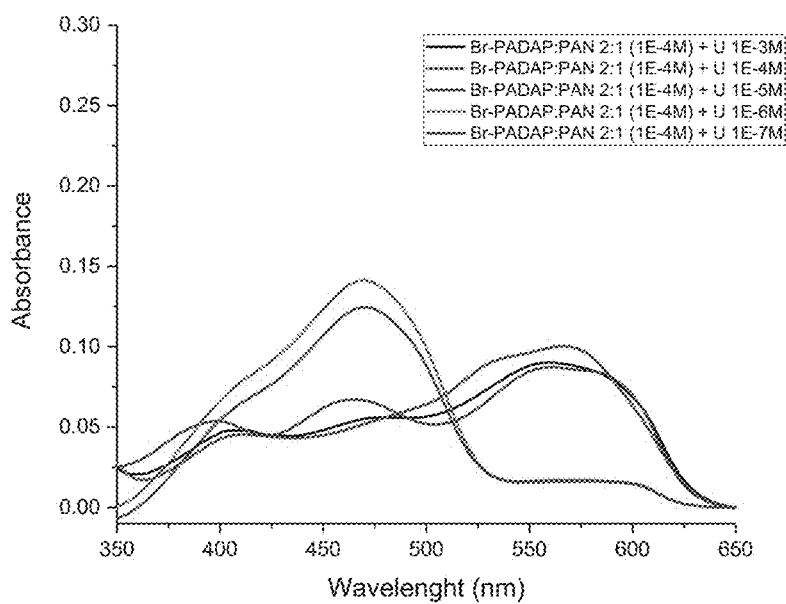
FIG. 9 depicts the ultraviolet visible spectra for varied concentrations of uranium contacted with a 2:1 ratio of a Br-PADAP:PAN solution.

Referring to FIG. 9, 2-(5-Bromo-2-pyridylazo)-5-(diethylamino)phenol (Br-PADAP) mixed with 1-(2-pyridylazo)-2-naphthol (PAN) showed the greatest affinity for activating in response to the presence of a uranium compound formation. Spectra for varied concentrations of uranium contacted with a 2:1 ratio of Br-PADAP:PAN solution are shown in FIG. 9. Uranium was detected at ppm-ppb concentrations. All Br-PADAP concentrations for this experiment were 1E-4M. This was found to be the optimal concentration for this colorimetric complexation 110.

Figure 10:
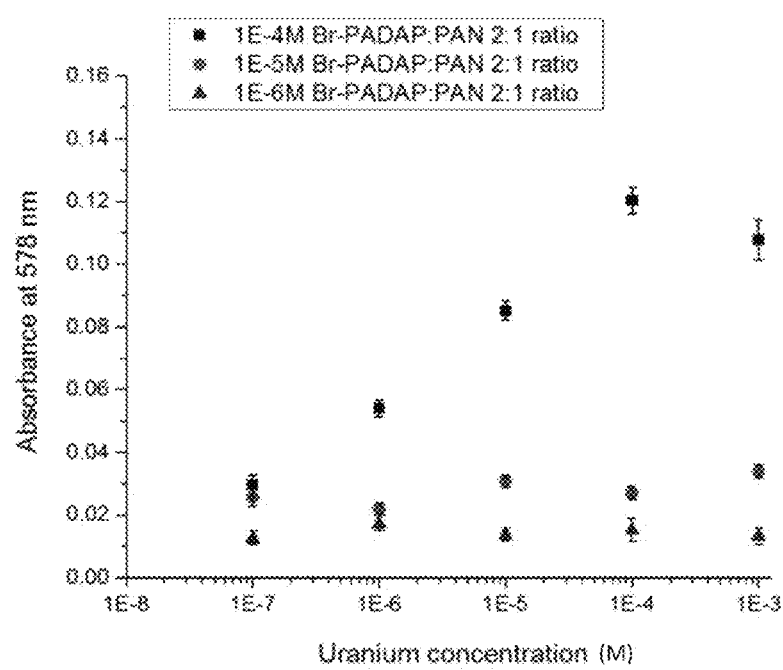
FIG. 10 depicts the ultraviolet visible spectra of uranium using a combination of Br-PADAP:PAN in a 2:1 ratio.
Figure 11:
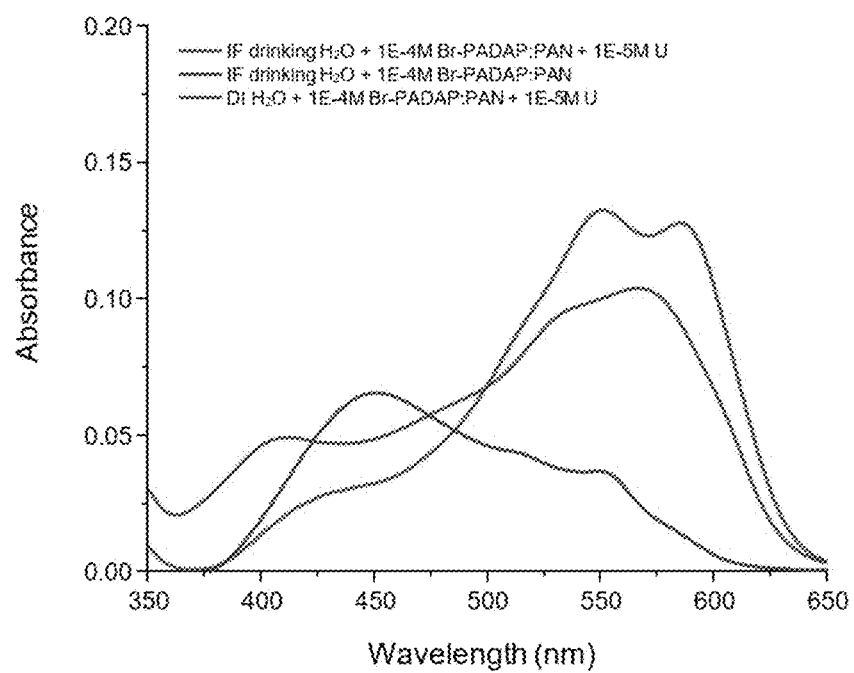

Referring to FIG. 10, the ultraviolet/visible spectra of U using a combination of Br-PADAP:PAN in a 2:1 ratio is shown. As FIG. 10 indicates, using a combination of Br-PADAP:PAN provides for a significantly higher absorbance over Br-PADAP and NaF alone. Referring to FIG. 11, the ultraviolet visible spectra of U using a combination of Br-PADAP:PAN in a 2:1 ratio is shown in drinking water. As FIG. 11 indicates, using the colorimetric complexation in normal mineralized municipal drinking water shows no sign of interference from ions such as calcium, iron, potassium, etc. The Br-PADAP:PAN complex also showed a high level of visually enhanced color over Br-PADAP alone.

Referring to FIG. 12, an embodiment of a support 102 used in a method for rapid detection of actinides is shown. A syringe column support 102, containing the colorimetric complexation 110, receives a sample 104 with an unknown concentration of at least one actinide within it. The sample 104 is placed in communication 106 with the support 102 by inserting the sample 104 into the support 102. The support 102 can process the sample 104 through one or more chambers, each chamber having a different purpose. In an embodiment with one chamber, the sample 104 is placed directly in communication 106 with the colorimetric complexation 110, without additional processing. In an embodiment with more than one chamber, the sample 104 may go through extraction chambers that contain resins to target the actinide in question, or chambers that contain masking agents, or chambers that contain sodium citrate used to remove interfering species such as iron, copper, or lead, or chambers that contain pH adjustment to mitigate false positive/negative responses, or chambers for other purposes for the accurate processing of the sample 104, or a combination of all the mentioned chambers. As shown in FIG. 13, in embodiments with more than one chamber in the support 102, the final chamber could be the chamber that contains the colorimetric complexation 110 that activates when contacted by a threshold concentration of an actinide. If the sample's 104 concentration of at least one actinide is equal to or greater than the threshold indication level, a visual indicator 108 appears from the colorimetric complexation 110. In this embodiment, the colorimetric complexation 110 can activate in visually distinct ways for different actinides, as shown in FIG. 13, a purple visual indicator 108 is given for uranium and a red visual indicator 108 is given for plutonium.

Referring to FIG. 14, five vials of activated colorimetric complexations are shown having activated to different concentrations uranium: 240 ppm, 24 ppm, 2.4 ppm, 240 ppb, and 24 ppb. The colorimetric concentration used was Br-PADAP:PAN in a 2:1 ratio at $1\times10^{-5}$M. U.

The colorimetric complexation 110 provides a rapid detection of actinides. Rapid can mean a visual indicator 108 appears within seconds, minutes, or hours. The amount of time it takes to receive a visual indicator 108 is determined by the selectivity and sensitivity of the test based upon the testing environment. And, is another parameter that would be used to select the colorimetric complexation 110. In an embodiment the visual indicator 108 appears at a predetermined time, for example, approximately 5 minutes.

Referring to FIG. 17, an embodiment of a support is shown. In this embodiment, the sample is urine having an unknown concentration of uranium within it. The support is a device containing the colorimetric complexation, and the device is placed in communication with the sample. The device can be placed in the area the sample stream is expected, catching the sample midstream. The device can be dipped into a collected sample of urine. The visual indicator appears on the device.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

Any element in a claim that does not explicitly state "means for" performing a specified function, or "step for" performing a specific function, is not to be interpreted as a "means" or "step" clause as specified in 35 U.S.C. § 112, ¶6. In particular, the use of "step of" in the claims herein is not intended to invoke the provisions of 35 U.S.C. § 112, ¶6.

The invention claimed is:

1. A method for rapid detection of actinides, the method comprising:
   a) having a support including a colorimetric complexation, wherein the colorimetric complexation is a hybrid combination of 2-(5-Bromo-2-pyridylazo)-5-(diethylaminol)phenol (Br-PADAP) and 1-(2-Pyridylazo)-2-naphthol (PAN), the colorimetric complexation configured to activate when contacted by at least one actinide;
   b) placing the support in communication with a sample through urinalysis, the sample having an unknown concentration of at least one actinide within it;
   c) activating the colorimetric complexation when contacted by the at least one actinide, and
   d) receiving one or more visual indicators from the colorimetric complexation on a condition that the sample contains at least a threshold concentration of the actinide, the visual indicators including a first visual indicator that is configured to produce a purple color on reaction with the sample on a condition that the sample contains at least a threshold concentration of uranium and a second visual indicator that is configured to produce a non-purple color on reaction with the sample on a condition that the sample contains at least a threshold concentration of an actinide that is plutonium, the first visual indicator and the second visual indicator being visible to a naked eye.

2. The method of claim 1, wherein the colorimetric complexation can detect actinides present in a concentration on the order of parts-per-billion.

3. The method of claim 1, wherein the support is a liquid that can be used as a spray.

4. The method of claim 1, wherein the support is a pod.

5. The method of claim 1, wherein the support is a wipe.

6. The method of claim 1, wherein the support is a gel.

7. The method of claim 1, wherein the support is capable of providing test results for different actinides.

8. The method of claim 1, wherein the sample is first separated from contamination.

9. The method of claim 1, wherein the visual indicator is received within a predetermined amount of time.

10. The method of claim 9, wherein the predetermined amount of time is within approximately 5 minutes.

11. The method of claim 1, further comprising repeating the steps a-c at least one time.

12. The method of claim 1, wherein the method is implemented in response to a radiological incident.

13. The method of claim 1, wherein the colorimetric complexation includes two parts Br-PADAP per part of PAN.

14. The method of claim 13, wherein the colorimetric complexation includes 1E-4M of Br-PADAP.

15. A method for rapid detection of actinides in a contamination, where the actinides are present in the concentration on the order of parts-per-billion, the method comprising:
   a) having a support including a colorimetric complexation, wherein the colorimetric complexation is a hybrid combination of 2-(5-Bromo-2-pyridylazo)-5-(diethylamino)phenol(Br-PADAP) and 1-(2-Pyridylazo)-2-naphthol (PAN), the colorimetric complexation configured to activate when contacted by a threshold concentration of at least one actinide;
   b) separating a sample separated from the contamination;
   c) placing the support in communication with the sample through urinalysis, the sample having an unknown concentration of at least one actinide within it;
   d) activating the colorimetric complexation when contacted by the at least one actinide, and
   e) receiving one or more visual indicators within about 5 minutes of the support communicating with the sample from the colorimetric complexation on a condition that the sample contains at least a threshold concentration of the actinide, the visual indicators including a first visual indicator that is configured to change to a purple color on a condition that the sample contains at least a threshold concentration of uranium and a second visual indicator that is configured to produce a non-purple color on a condition that the sample contains at least a threshold concentration of an actinide that is plutonium.

16. The method of claim 15, wherein the colorimetric complexation can detect actinides present in a concentration on the order of parts-per-billion.

17. The method of claim 15, wherein the support is selected from the group consisting of a liquid that can be used as a spray, a pod, a wipe, and a gel.

18. The method of claim 15, wherein the support is capable of providing test results for different actinides.

19. The method of claim 15, further comprising repeating the steps a-d at least one time.

20. The method of claim 15, wherein the method is implemented in response to a radiological incident.

* * * * *